Jan. 1, 1946.          C. STERN                2,392,009
           SAFETY PRESSURE RELIEF VALVE
           Filed June 8, 1944        2 Sheets-Sheet 1
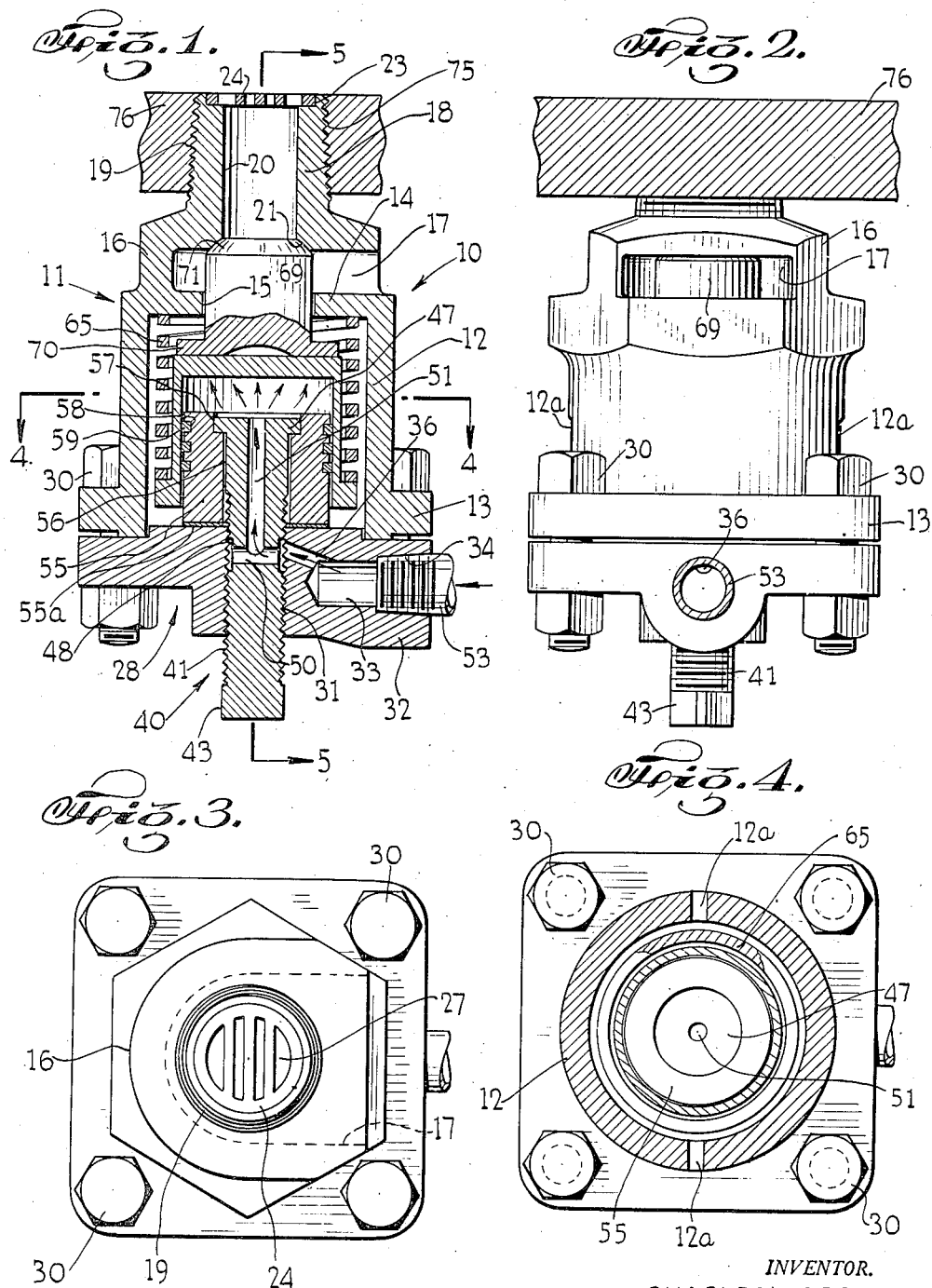
INVENTOR.
CHARLES STERN
BY
J.B.Felshin
ATTORNEY Jan. 1, 1946.   C. STERN   2,392,009
SAFETY PRESSURE RELIEF VALVE
Filed June 8, 1944   2 Sheets-Sheet 2
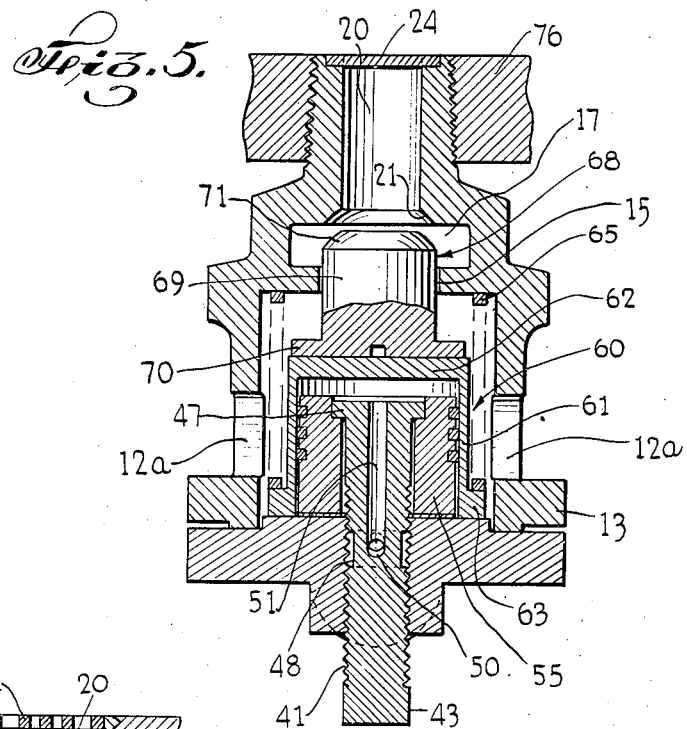
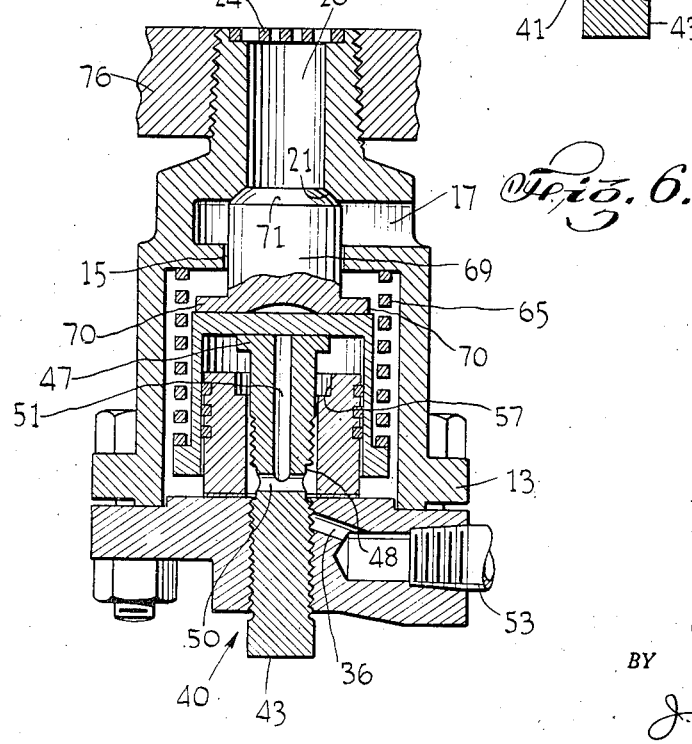
INVENTOR.
CHARLES STERN
BY
J. B. Felshin
ATTORNEY Patented Jan. 1, 1946

2,392,009

UNITED STATES PATENT OFFICE 2,392,009

SAFETY PRESSURE RELIEF VALVE

Charles Stern, Jersey City, N. J.

Application June 8, 1944, Serial No. 539,295

8 Claims. (Cl. 121—134)

This invention relates to safety pressure relief valves. It is particularly directed to a cylinder cock which may be attached to cylinders of steam engines to relieve excessive pressure therein, and for the like purposes.

An object of this invention is to provide a device of the character described comprising a valve member adapted to be seated on a seat in a valve body, by fluid pressure, and including mechanical means to retain the valve member in seated position independent of the fluid pressure.

Another object of this invention is to provide a safety pressure relief device of the character described having a valve member adapted to be seated on a valve seat, a cup adapted to be pressed against the valve member by fluid pressure supplied to said device, and spring means normally urging the cup away from the valve member to permit it to become unseated.

Yet another object of this invention is to provide in a device of the character described, a piston within said cup, and a screw threaded stem screwed to the valve body and passing through the piston and adapted to retain the piston against movement, and said stem having a passage to permit fluid under pressure to enter the cup, and said stem furthermore being adapted to be screwed against the cup to press the valve member against its slot.

Yet another object of this invention is to provide a compact, rugged and durable device of the character described which shall be relatively inexpensive to manufacture, smooth and positive in operation, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention, Fig. 1 is an elevational cross-sectional view of a device embodying the invention;

Fig. 2 is a side view thereof;

Fig. 3 is a top plan view thereof;

Fig. 4 is a cross-sectional view taken on line 4—4 of Fig. 1;

Fig. 5 is a cross-sectional view taken on line 5—5 of Fig. 1; and

Fig. 6 is a view similar to Fig. 1, but showing the valve member retained in seated condition on the valve seat.

Referring now in detail to the drawings, 10 designates a safety pressure relief device embodying the invention. The same comprises a body 11 closed at its lower end by a base 28. Body 11 has a cylindrical portion 12 formed with a bottom flange 13 and having longitudinal slots 12a. At the upper end of the cylinder 12 is a transverse wall 14 formed with a central opening 15. Extending upwardly from the wall 14 is a U-shaped wall 16 forming a relief passage 17 opening to one side of the body.

Extending from the U-shaped wall 16 is a hub 18 formed with external pipe threads 19. Hub 18 is provided with a central through passage 20 formed at its lower end with a valve seat 21 or opening communicating with the passage 17. At the upper end of through opening 20 is an enlarged opening 23 forming a seat for a grid disc 24 inserted therein. The grid 24 may comprise a metal disc formed with slots 27.

Attached to flange 13 at the lower end of the body 11 is the base 28. Base 28 and flange 13 have registering openings to receive the attaching bolts 30 at the four corners thereof. Base 28 is formed with a central axial through screw threaded opening 31. It is also formed with a radial hub 32 on the underside thereof.

Hub 32 is formed with an opening 33 formed with pipe threads 34 at its outer end. Connecting opening 31 and 33 is a small inclined opening 36. It will be noted that openings 36 and 31 meet below the upper surface of the base 28. Screwed within opening 31 is a piston rod or stem 40.

The stem 40 has an intermediate screw threaded portion 41 receiving the threads of opening 31. At the lower end of stem or piston rod 40 is a nut head 43 for receiving a wrench to turn the screw. At the upper end of rod 40 is an enlarged head 47. It will be noted that the screw threads of threaded portion 41 terminate short of the head 47. The rod 40 is formed with an annular intermediate groove 48 cut into the screw threaded portion thereof. Said rod is also formed with a diametric screw opening 50 communicating with the groove 48. Said rod is furthermore formed with an axial opening 51 extending from opening 50 to the upper end of the rod. When the piston rod, stem, or screw 40 is in the position shown in Fig. 1, opening 36 communicates with groove 50. An air hose or air pipe 53 or any conduit to supply fluid pressure to the device 10 may be screwed to the threaded opening 34. Fluid pressure such as air or steam may thus pass through opening 33 through opening 36, groove 48, opening 50, and passage 51, to a point above the piston rod 40.

At the upper end of the piston rod and disposed within the cylinder 12 is a piston 55. The same is formed with a through opening 56 to loosely receive the upper end of the piston rod. At the upper end of the opening 56 is an enlarged opening 57 to receive the head 47 of the piston rod. The piston 55 may be formed with spaced external grooves 58 to receive piston rings 59.

Received on the piston 55 and contacting the piston rings 58 is a piston cup 60. The cup 60 has a cylindrical wall 61 closed at the top by a top wall 62. It is formed at its lower end with an outwardly extending flange 63. Surrounding the cup 60 and interposed between flange 63 and the under surface of transverse wall 14 is a spring 65 normally urging the cup 60 downwardly.

On the top wall 62 of the cup 60 is a valve member 68. The same comprises a cylindrical portion 69 passing through opening 15, and the same is formed with a flange 70 at its lower end. At the upper end of cylindrical portion 69 is a tapered surface 71 adapted to seat on the valve seat 21.

The hub 18 is adapted to be screwed into a screw threaded opening 75 of a wall 76. The wall 76 may be the cylindrical wall of a steam cylinder or the wall of any other vessel for fluid under pressure which it is desired to relieve when the pressure exceeds a predetermined amount.

Fig. 1 shows the safety device in operative position. Fluid pressure enters the cup 60 and presses the same upwardly against the pressure of spring 65 for retaining valve member 68 in seated condition. The upward pressure on the valve member 68 is normally greater than the pressure within the vessel. However, should the pressure within the vessel exceed a predetermined amount, it will unseat member 68 and pressure will be relieved through passage 17. The piston rings 59 seal the air within the cup. If there is any leakage or air pressure through the screw threads of the rod 40 and the threaded opening 31, such pressure will be dissipated through slots 12a.

It will be noted that the rod 40 is normally screwed down as far as it can go keeping the piston 55 down on the base. A gasket 55a may be interposed between the piston and the base. If pressure to the safety device is cut off and there is no pressure within the steam cylinder, spring 65 will press the cup down to retain the safety device open. If pressure to hose or pipe 53 is not available and if it is nevertheless desired to keep the valve closed, piston rod 40 may be screwed up to the position shown in Fig. 6, where it presses against the underside of the top wall 62 of the cup to press valve member 68 against the valve seat 21.

It will be noted that when the piston rod 40 is in the position shown in Fig. 1 threads of the piston rod 40 will engage threads of the opening 31 on opposite sides of the groove 48 so as to keep air pressure from the underside of the piston 55.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. A safety cylinder device, comprising a body, said body having a cylindrical portion, and a flange at the lower end of the cylindrical portion and being formed with a transverse wall at the upper end of said cylindrical portion, said transverse wall being formed with a central opening, said body having a passage opening to one side of the body and communicating with said opening, said body having a valve opening formed with a valve seat and communicating with said passage, a valve member extending through said opening and across said passage and being adapted to be seated on said valve seat, to close said valve opening, a cup within said cylinder contacting said valve member, a piston within said cup contacting the inside of the latter, a base attached to the flange at the lower end of the cylinder and formed with a screw threaded opening, said piston being formed with a through opening, and a piston rod passing through the opening in the piston, and being screwed to the threaded opening in the base, said piston rod being formed with a passage leading to the inside of the cup and said passage being adapted to be shut off upon adjusting said piston longitudinally of its axis.

2. A safety cylinder device, comprising a body, said body having a cylindrical portion, and a flange at the lower end of the cylindrical portion and being formed with a transverse wall at the upper end of said cylindrical portion, said transverse wall being formed with a central opening, said body having a passage opening to one side of the body and communicating with said opening, said body having a valve opening formed with a valve seat and communicating with said passage, a valve member extending through said opening and across said passage and being adapted to be seated on said valve seat, to close said valve opening, a cup within said cylinder contacting said valve member, a piston within said cup contacting the inside of the latter, a base attached to the flange at the lower end of the cylinder and formed with a screw threaded opening, said piston being formed with a through opening, and a piston rod passing through the opening in the piston, and being screwed to the threaded opening in the base, said piston rod being formed with an annular groove, and with a diametric through opening communicating with said groove and with an axial passage connecting said transverse opening with the upper end of the rod, and said base being formed with an opening communicating with the screw threaded opening thereof, and adapted to register with the annular groove in said rod.

3. A safety relief device, comprising a body formed with a valve seat, a valve member to close said seat, a cup contacting said valve member, a spring interposed between said cup and said body, a piston within said cup, a member longitudinally adjustable relative to said body, and passing through the piston, and being adapted in one position thereof to permit movement of the cup, and in another position thereof to retain the cup against movement, and means to supply fluid under pressure to said cup when said member is in the first-mentioned position, and to shut off fluid pressure when said member is in the latter position.

4. A safety relief device, comprising a body formed with a valve seat, a valve member to close said seat, a cup contacting said valve member and formed with an outwardly extending flange at its open end, a spring mounted on the cup and interposed between said flange and said body, a piston within said cup, and a member screwed relative to said body, and passing through the piston, and being adapted in one position thereof to permit movement of the cup, and in another position thereof to retain the cup against movement, said member being formed with a passage to carry fluid under pressure to the inside of the cup.

5. A safety relief device, comprising a body formed with a valve seat, a valve member to close said seat, a cup contacting said valve member and formed with an outwardly extending flange at its open end, a spring mounted on the cup and interposed between said flange and said body, a piston within said cup, and a member screwed relative to said body, and passing through the piston, and being adapted in one position thereof to permit movement of the cup, and in another position thereof to retain the cup against movement, said member being formed with a passage to carry fluid under pressure to the inside of the cup, and means to shut off said passage in one position, to said member.

6. A pressure relief device, comprising a body having a recess open at one end, a flange at the open end of the recess, a transverse wall at the opposite end of said recess, said transverse wall being formed with an opening, said body being formed with a relief passage communicating with said opening, and extending to the exterior of the body, and the body furthermore being formed with a hub having a through passage formed with a valve seat adjacent said relief passage, a base attached to the flange to close the open end of the recess, said base being formed with a central screw threaded opening communicating with said recess, and with an opening to receive a conduit for supplying fluid under pressure, and communicating with an intermediate portion of said screw threaded opening, a screw stem screwed within said screw threaded opening, a piston within the recess received on said stem, a cup shaped member on said piston, and a valve member on said cup shaped member passing through the opening in the transverse wall, and being adapted to be seated on said valve seat, said screw stem being formed with a passage to connect said conduit with the interior of said cup, and said passage being adapted to be shut off in one position of said screw stem.

7. A pressure relief device, comprising a body having a recess open at one end, a flange at the open end of the recess, a transverse wall at the opposite end of said recess, said transverse wall being formed with an opening, said body being formed with a relief passage communicating with said opening, and extending to the exterior of the body, and the body furthermore being formed with a hub having a through passage formed with a valve seat adjacent said relief passage, a base attached to the flange to close the open end of the recess, said base being formed with a central screw threaded opening communicating with said recess, and with an opening to receive a conduit for supplying fluid under pressure, and communicating with an intermediate portion of said screw threaded opening, a screw stem screwed within said screw threaded opening, a piston within the recess received on said stem, a cup shaped member on said piston, a valve member on said cup shaped member passing through the opening in the transverse wall, and being adapted to be seated on said valve seat, and a spring on said cup shaped member interposed between said flange and said transverse wall.

8. A pressure relief device, comprising a body having a recess open at one end, a flange at the open end of the recess, a transverse wall at the opposite end of said recess, said transverse wall being formed with an opening, said body being formed with a relief passage communicating with said opening, and extending to the exterior of the body, and the body furthermore being formed with a hub having a through passage formed with a valve seat adjacent said relief passage, a base attached to the flange to close the open end of the recess, said base being formed with a central screw threaded opening communicating with said recess, and with an opening to receive a conduit for supplying fluid under pressure, and communicating with an intermediate portion of said screw threaded opening, a screw stem screwed within said screw threaded opening, a piston within the recess received on said stem, a cup shaped member on said piston, a valve member on said cup shaped member passing through the opening in the transverse wall, and being adapted to be seated on said valve seat, a spring on said cup shaped member interposed between said flange and said transverse wall, said stem having a head at one end engaging said piston, and said stem being formed with an annular groove, and with a diametric passage communicating with the groove, and with an axial passage connecting the diametric passage with the headed end of said stem.

CHARLES STERN.